United States Patent

[11] 3,613,838

| [72] | Inventor | Karl-Heinz Pape<br>Kleinenbremen, Germany |
|---|---|---|
| [21] | Appl. No. | 25,084 |
| [22] | Filed | Apr. 2, 1970 |
| [45] | Patented | Oct. 19, 1971 |
| [73] | Assignee | Maschinenfabrik Hans Lanze KG<br>Bosingfeld Lippe, Germany |
| [32] | Priority | Apr. 21, 1969 |
| [33] | | Germany |
| [31] | | P 19 20 127.5 |

[54] AUTOMATIC ADJUSTING DEVICE FOR CLUTCHES AND BRAKES
5 Claims, 3 Drawing Figs.

[52] U.S. Cl. ............................................. 188/163,
188/71.8, 188/196 P, 192/84 B, 192/111 A
[51] Int. Cl. .................................................. F16d 65/52,
F16d 13/75
[50] Field of Search ............................................ 192/70.25,
70.26, 84 B, 111 A; 188/71.8, 196 P, 163

[56] References Cited
UNITED STATES PATENTS

| 2,591,989 | 4/1952 | Winter | 192/84 B X |
|---|---|---|---|
| 2,822,906 | 2/1958 | Wisman | 192/84 B |
| 2,973,850 | 3/1961 | Jaeschke | 192/111 A X |
| 3,394,787 | 7/1968 | Fitzgerald | 192/111 A X |
| 3,458,022 | 7/1969 | Reiff | 192/111 A X |
| 3,485,330 | 12/1969 | Reiff | 192/111 A X |

*Primary Examiner*—Allan D. Herrmann
*Attorney*—Edwin E. Greigg

ABSTRACT: In an electromagnetic brake, clutch or the like, an automatic adjusting device compensating for the wear of the friction elements includes an armature arbitrarily movable towards and away from said friction elements; pressure bolts held in said armature and in an adjacent stationary member by unidirectionally locking spring elements so that the pressure bolts, adapted to exert a force on said friction elements through a pressure ring, are automatically moved with respect to said armature towards said friction elements by the amount of wear of the latter.

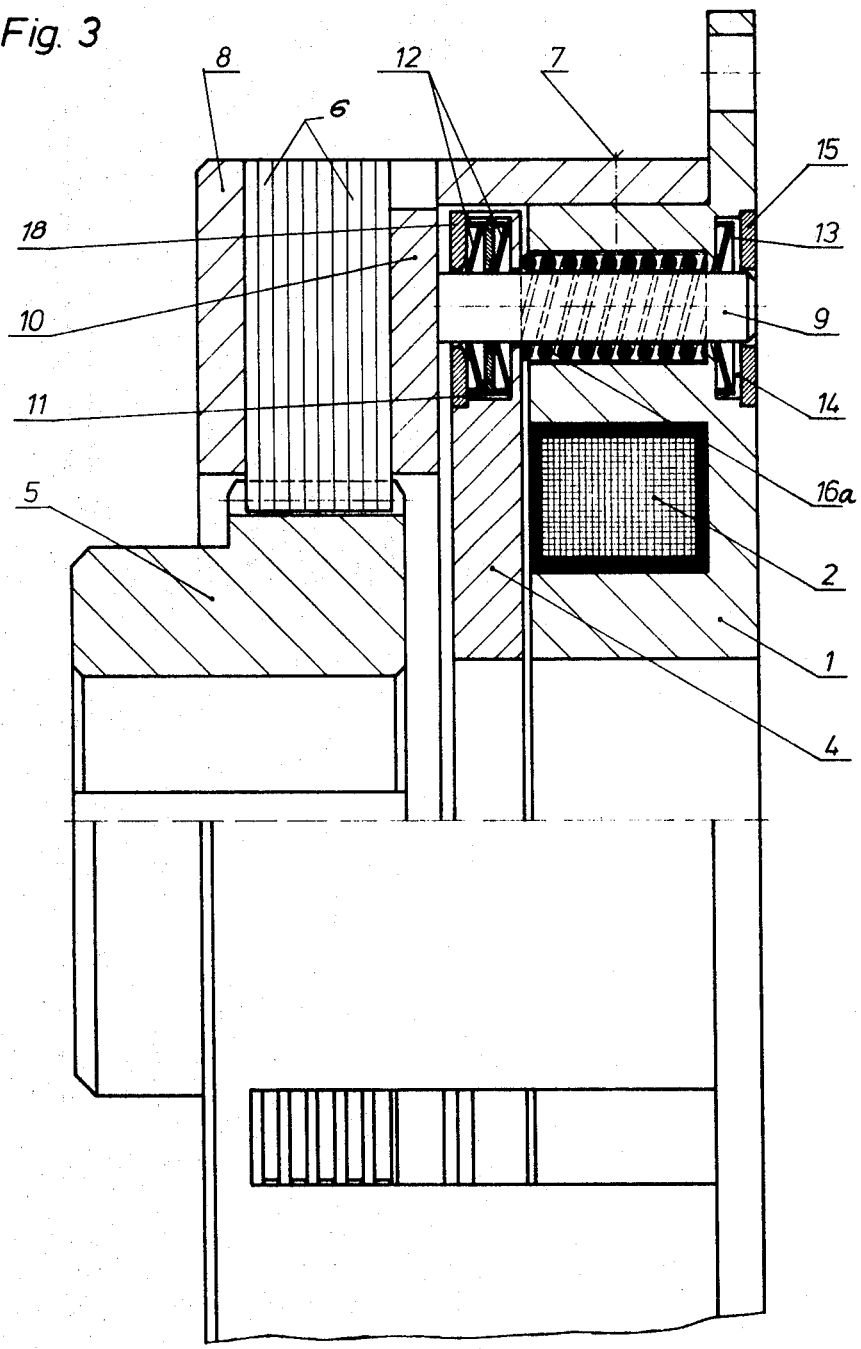

AUTOMATIC ADJUSTING DEVICE FOR CLUTCHES AND BRAKES

BACKGROUND OF THE INVENTION

This invention relates to an automatic-adjusting mechanism associated with preferably electromagnetically operated clutches or brakes wherein the armature, displaceable by a solenoid, is connected with a pressure ring or pressure member to move the latter into or out of contact with a friction shoe or laminae secured to a rotor. As the friction faces wear away, the said automatic-adjusting mechanism advances the pressure ring or pressure member with respect to the armature by a distance corresponding to the thickness of the wear so that the stroke of the armature remains approximately constant despite such wear.

In a known structure of the aforenoted type, the pressure ring is externally mounted on a threaded ring which, in turn, is threadedly engaged by the armature. The threads in the armature and those in the pressure ring are of opposed course. When the wear of the friction faces reaches a certain extent, the pressure force exerted by the pressure ring on the friction faces will no longer be sufficient to generate the required coupling or braking torque, because, upon energization of the solenoid, the armature will move into engagement with the magnetic core. Upon such occurrence by virtue of the friction between the armature and the magnetic core, there is generated a torque between the armature mounted on the external carrier member and the pressure ring affixed to the carrier member for rotation as a unit therewith. The last-named torque causes a rotation of the pressure ring with respect to the armature in the direction of the friction faces. After such adjustment, the armature, until again a subsequent wear of predetermined value sets in, will not contact the magnetic core upon electromagnetic actuation and thus the entire electromagnetic force may again be used to urge the pressure ring against the friction faces.

A disadvantage of such known structure resides in the fact that a relatively substantial wear of the friction faces and a defective operation (insufficient pressure and torque), as well as a significant heating of the clutch due to friction between armature and magnetic core, occur before the above-noted adjustment takes place. Furthermore, due to the relatively substantial change of the airgap, until the correction thereof, the switching time of the clutch changes, resulting in a nonuniform switching operation. Finally, there is a danger of scoring caused by the frictionally engaging faces of the magnetic core and the armature.

In another known structure of an automatic adjustment device of the aforenoted type, one part of a two-part pressure bar is turned outwardly from the other part by means of a spindle and nut through a relatively complicated linkage system and an overriding clutch when the wear of the friction faces has exceeded a predetermined extent.

OBJECT, SUMMARY AND ADVANTAGES OF THE INVENTION

It is an object of the invention to provide, for preferably electromagnetically operated clutches and brakes, an improved automatic-adjusting device which becomes effective even upon the smallest wear of the friction faces and from which the aforenoted disadvantages are eliminated.

Briefly stated, the armature is connected with a pressure ring (which is adapted to press together the friction faces associated with the driving and driven part of the clutch or brake) through pressure bolts axially displaceably held in an axially stationary component of the clutch or the brake and extending into a bore of the armature. The said bolts carry annular first spring elements disposed in said bore of the armature and second spring elements disposed in an opening of said axially stationary component. The said spring elements lock the pressure bolts in one axial direction and, upon a wear of the friction faces, permit an advancement of the bolts through a distance which is composed of the required stroke of the armature and the amount of the wear. Said spring elements, however, permit a return of the pressure bolts only to an extent corresponding to the magnitude of the armature stroke. Thus, as the armature returns to its position of rest, the bolts are advanced with respect to the armature by the amount of wear of the friction faces.

It is an advantage of the invention that, besides the simplicity of structure, the adjustment is performed continuously in response to even a very small wear. Thus, the armature stroke is maintained at a constant value. If, instead of planar bolts profile bolts are used, the adjustment may be made effective only upon a predetermined amount of wear.

The invention will be better understood, as well as further objects and advantages will become more apparent from the ensuing detailed specification of three exemplary embodiments of the invention taken in conjunction with the drawing.

BRIEF DESCRIPTION OF THE DRAWING

FIG. 3 is an axial sectional view of a third embodiment of the invention.

DESCRIPTION OF THE FIRST EMBODIMENT

Figure 1:
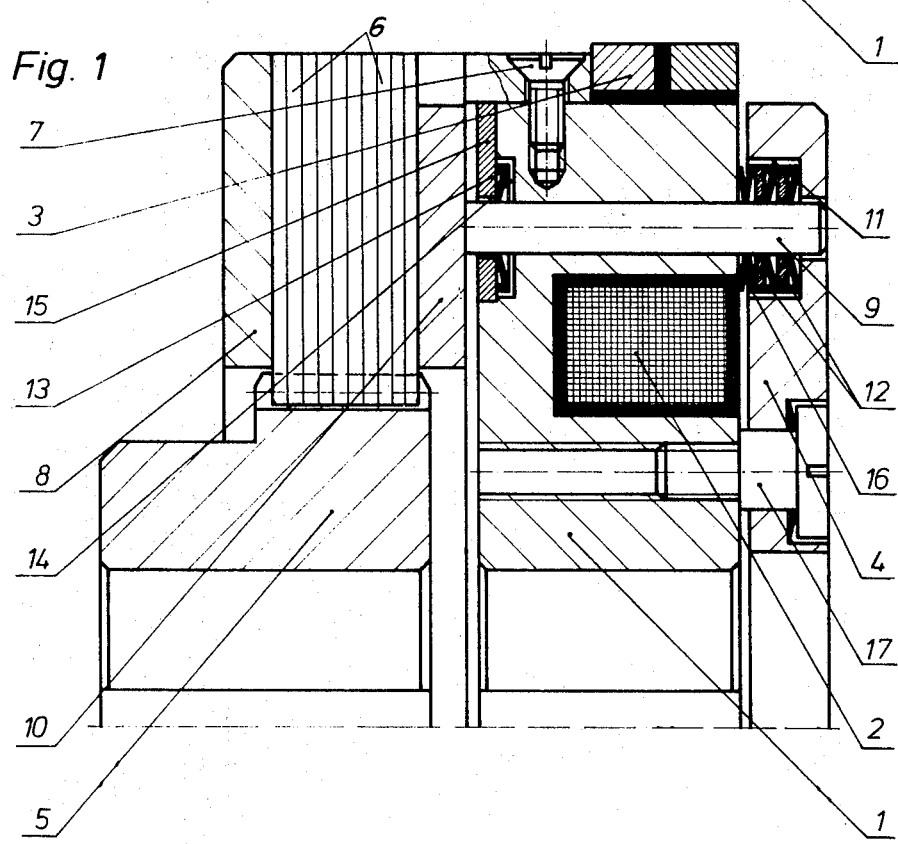
FIG. 1 is an axial sectional view of a first embodiment of the invention.

Turning now to FIG. 1, the magnetic clutch shown therein comprises essentially a stationary component formed of a magnetic core 1 adapted to be keyed to a shaft, for example, the driving shaft (not shown), a solenoid 2 disposed in core 1, slip rings 3 through which current may be supplied to the solenoid 2, an arbitrarily movable member, such as an armature 4, a rotor 5 adapted to be keyed to the driven shaft (not shown), and a schematically shown lamina stack of friction elements 6 associated with the rotor 5. The magnetic core 1 is attached to the clutch housing 8 by means of screws 7 (one shown). The clutch housing 8 carries the external laminae of the friction elements 6, while the inner laminae are attached to the rotor 5. The magnetic core 1 is provided with a plurality of axially parallel extending bores arranged equidistantly about the clutch axis. In each said bore there is reciprocably disposed a pressure bolt 9 (only one visible in the drawing) engaging a pressure ring 10 which may be brought into or out of engagement with the last lamina of the friction elements 6. The end portion of each pressure bolt 9 remote from the pressure ring 10 projects from the magnetic core 1 and extends into a cavity 11 of the armature 4. On said last-named end portion of each pressure bolt 9 there are mounted two resilient locking elements 12 which may be, for example, Belleville-type washers and which firmly engage the pressure bolt 9 with respect to one direction. A further locking element 13 surrounds the pressure bolt 9 in the vicinity of pressure ring 10 and is disposed in a cavity 14 of the magnetic core 1. The locking element 13, similarly to locking elements 12, firmly engages the pressure bolt 9 with respect to one direction. Stated in other terms, both the locking elements 12 and 13 are secured to the pressure bolt 9 in such a manner that the latter, when said locking elements are held stationary, may move with respect thereto towards, but not away from, lamina stack of the friction elements 6. The cavity 14 is covered by a closure disc 15 and is, by the required armature stroke, deeper than the axial dimension of the locking element 13. Further, each pressure bolt 9 is associated with a return spring 16 which, with one end, engages the magnetic core 1 and, with its other end, engages a spring seat disc disposed in front of the locking elements 12. The armature 4 is held on the magnetic core 1 by means of a support bolt 17.

OPERATION OF THE FIRST EMBODIMENT

When the solenoid 2 is unenergized, the return spring 16 urges the armature 4 away from the magnetic core 1 through the locking elements 12. The pressure bolt 9, disposed loosely in its associated bore is, by virtue of friction, moved by and with the locking elements 12. The pressure bolt 9, in turn, carries with it the locking element 13 until the latter engages the base of the cavity 14 in the magnetic core 1. In such a position, there is no pressure exerted on the pressure ring 10 and thus, the outer and inner laminae are not pressed to one another. Consequently, the clutch is disengaged and no torque is transmitted from the driving shaft to the driven shaft.

If the solenoid 2 is energized and thus attracts the armature 4, the latter carries with it the pressure bolt 9 through the locking elements 12. Upon such a displacement, the return spring 16 is compressed. The locking element 13 is carried with the pressure bolt 9 by virtue of its frictional engagement therewith and is moved into contact with and lies against the closure disc 15 without thereby interfering with the motion of the pressure bolt 9. The pressure ring 10 compresses the laminae and consequently the clutch is in an engaged position whereby torque is transmitted from the driving shaft to the driven shaft.

For purposes of illustration, it is now assumed that the required stroke of the armature is 2 mm. and there is an aggregate wear of 0.5 mm. of the friction elements.

Upon energization of the solenoid 2, the armature 4, the pressure bolt 9 and the locking elements 12, 13 move towards the lamina stack of the friction elements 6. Upon a travel of 2 mm. the locking element 13 engages the closure disc 15 and remains stationary, while the pressure bolt 9 and the armature 4 move another 0.5 mm. (the thickness of the wear), whereupon the lamina stack is compressed and thus the clutch is engaged. It is thus seen that the armature 4 and the bolt 9 moved a total of 2.5 mm. towards the lamina stack of the friction elements 6.

Upon deenergization of the solenoid 2, the spring 16 moves the locking elements 12 and thus the armature 4, as well as the pressure bolt 9 and the locking element 13 away from the lamina stack. The return movement of pressure bolt 9 is assisted by the axially expanding laminae. Upon a travel of 2 mm., the locking element 13 engages the base of the cavity 14 and since in this direction of movement it lockingly engages the pressure bolt 9, no further movement of the latter away from the lamina stack is permitted. Urged by spring 16, the locking elements 12, however, slide with respect to pressure bolt 9 and thus the locking elements 12, together with the armature 4, will continue to move another 0.5 mm. to the position of rest of armature 4.

It is thus seen that while during the return movement the pressure bolt 9 was allowed to travel only the distance corresponding to the required stroke of the armature 4, the latter was caused to move an additional distance, corresponding to the thickness of the wear. Consequently, as the armature 4 returns to its position of rest in which it engages the head of securing bolt 17, the pressure bolt 9 has been moved towards the lamina stack with respect to the armature 4 exactly by the amount of the wear.

It is to be noted that the above-given thickness of wear (0.5 mm.) is only exemplary to explain the operation of the adjusting mechanism and that the aforedescribed adjustment steps are automatically performed even upon the slightest wear.

Thus, the air gap between the magnetic core 1 and the armature 4 and the extent of compression of the return spring 16 are of the same magnitude as prior to the wear of the laminae.

It is seen from the foregoing description that a correction of the position of pressure bolt 9 is continuous and occurs even in case of the smallest wear of the friction faces.

DESCRIPTION OF THE SECOND EMBODIMENT

Figure 2:
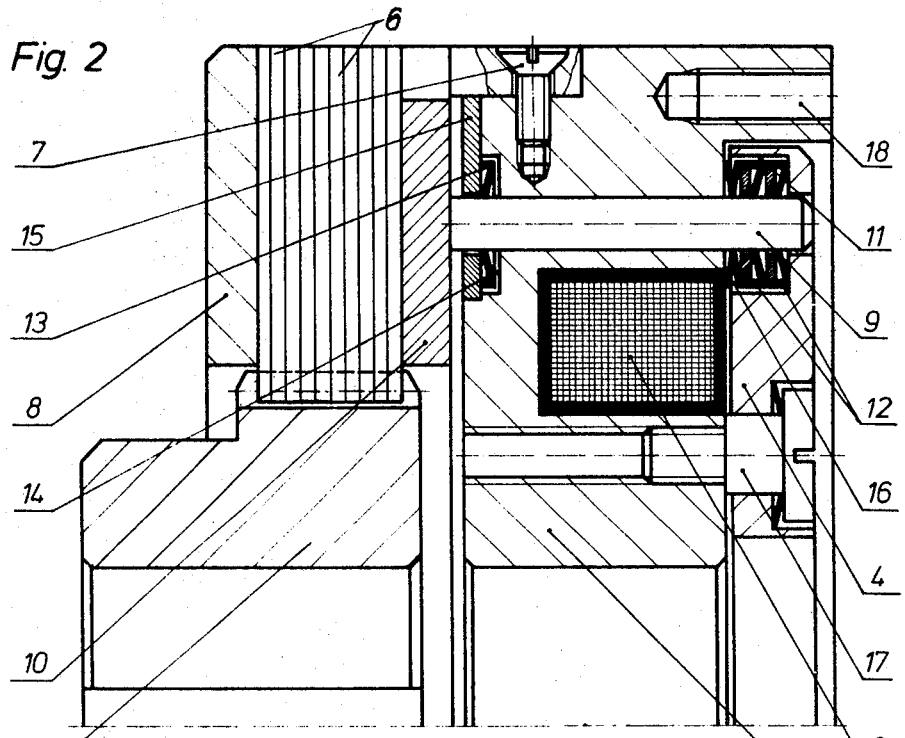
FIG. 2 is an axial sectional view of a second embodiment of the invention.

Turning now to FIG. 2, the embodiment shown therein is a magnetic brake having a magnetic core 1 secured by a plurality of screws 18 to a stationary part, for example, a motor flange (not shown). When the solenoid 2 is in an unenergized condition, the pressure bolt 9, together with the pressure ring 10, is axially moved away from the lamina stack of friction elements 6 and the armature 4 is displaced into its position of rest shown in FIG. 2. Both motions are effected by means of the brake release spring 16 through the locking elements 12 frictionally engaging the pressure bolt 9. In this position, the brake is in a released condition: no force is exerted on the laminae and, consequently, the rotor 5 may freely rotate with the shaft on which it is mounted.

When the solenoid 2 is energized, the armature 4 is attracted thereto. Through the locking elements 12 the armature carries with it the pressure bolt 9 and the pressure ring 10 and, as a result, the lamina stack of friction elements 6 is compressed. By virtue of the frictional engagement of the laminae with the stationary pressure ring 10, the rotor 5 and thus the shaft (not shown) are braked.

The operation of the adjusting device is identical to the magnetic clutch described in connection with FIG. 1.

DESCRIPTION OF THE THIRD EMBODIMENT

Turning now to FIG. 3, the embodiment shown therein is a spring-operated brake with electromagnetic release. The stationarily disposed magnetic core 1 is fixedly secured to the housing 8 which carries the external laminae of the lamina stack of friction elements 6. The pressure ring 10 extends with an external edge into a groove of the housing 8 and is thereby secured against rotation. With the pressure ring 10 there are associated a plurality of pressure bolts 9 (only one shown) equidistantly disposed about the brake axis and displaceably held in the magnetic core 1. The armature 4, which in this embodiment is disposed on the same side of the magnetic core 1 as the lamina stack of friction elements 6, is provided with a plurality of cavities 11, each of which is covered by a closure disc 18. On the end portion of pressure bolt 9 adjacent the pressure ring 10 there are arranged two locking elements 12 disposed in the cavities 11. The other side of the magnetic core 1 is provided with cavities 14, each disposed in axial alignment with a cavity 11. On the end portion of the pressure bolt 9 remote from the pressure ring 10, there is arranged a further locking element 13 which is accommodated by the cavity 14. Each of the latter is covered by a closure disc 15. The cavity 14 is, by the thickness of the required airgap, deeper than the axial dimension of the locking element 13. Between each two closure discs 15 and 18 is disposed a brake spring 16a surrounding the pressure bolt 9.

When the solenoid 2 is unenergized, the brake springs 16a urge the armature 4 away from the magnetic core 1. The armature carries with it the pressure bolt 9 by means of the locking elements 12 which are in frictional engagement with the pressure bolt 9. The latter presses the pressure ring 10 against the lamina stack of friction elements 6 and thus the rotor 5, together with the shaft (not shown) keyed thereto, is braked. When the solenoid is energized, the armature 4 is attracted thereto and as a result, each brake spring 16a is compressed and the pressure on each pressure bolt 9, and consequently on the pressure ring 10 and the lamina stack, is relieved. The pressure bolt 9 is withdrawn with the armature 4 by virtue of the frictional engagement of spring elements 12 and 13 with the pressure bolt 9. Also, the latter is urged away from the lamina stack by the axial expansion thereof. As a result, the brake is released.

Upon a wear of the laminae, the locking elements 12 and 13 cause, as described in connection with the first embodiment, a displacement (towards the lamina stack) of the pressure bolt 9 equaling the distance of the armature stroke and the thickness of the wear. The path of withdrawal, traveled by the pressure bolt 9 upon energization of the solenoid 2 for releasing the brake, equals the armature stroke. Any further displacement of the pressure bolt 9 in the same direction is prevented by the locking element 13 assuming a face-to-face contact with the closure disc 15 affixed to the magnetic core 1. Thus, as described before, the pressure bolt 9 is again advanced by the amount of the wear in the armature 4, while the armature stroke remains constant.

With certain modifications, the structure shown in FIG. 3 may be used as a spring-operated clutch. For such an application, instead of the brake spring 16a, clutch springs are provided which, when the solenoid 2 is unenergized, urge the pressure bolt 9 and the pressure ring 10 against the lamina stack of friction elements 6. During energization of the solenoid 2, on the other hand, the clutch is disengaged overcoming the force of the aforenoted clutch springs. Since for such a use the solenoid 2 has to rotate, it is supplied with electric current through slip rings similarly to the first embodiment.

It is to be understood that instead of the lamina stack of friction elements 6, brakeshoes or the like may be used in any of the embodiments discussed hereinabove.

That which is claimed is:

1. In an adjusting device associated with an electromagnetically operated brake mechanism to compensate for the wear of friction faces, said mechanism is of the known type having (A) a rotary member, (B) friction elements mounted on said rotary member, (C) an arbitrarily movable armature displaceable towards and away from said friction elements to cause an engagement and disengagement, respectively, of said mechanism, and (D) pressure means held in said armature and extending towards said friction elements, said pressure means, when said armature is displaced towards said friction elements, cause a compression of the latter, the improvement comprising, A. a stationary component disposed adjacent said armature,
B. at least one pressure bolt extending into said armature and said stationary component, said pressure bolt constituting said pressure means,
C. a first locking element engaging said pressure bolt and disposed in said armature, said first locking element permitting movement of said pressure bolt with respect thereto solely in the direction of said friction elements,
D. a second locking element engaging said pressure bolt and disposed in said stationary component for limited movement therein with said pressure bolt, said second locking element permitting movement of said pressure bolt with respect thereto solely in the direction of said friction elements, and
E. resilient means urging said first and second locking elements, said pressure bolt and said armature away from said stationary component.

2. An improvement as defined in claim 1, wherein said second locking element is disposed in a cavity of said stationary component, said cavity is by the desired stroke of said armature deeper than the dimensions of said second locking element along the axis of said pressure bolt.

3. An improvement as defined in claim 1, wherein said resilient means is formed of a spring surrounding said pressure bolt, said spring engages said stationary component and said first locking element and urges said pressure bolt away from said friction elements.

4. An improvement as defined in claim 1, wherein said armature is disposed between said stationary component and said friction elements, said resilient means is formed of a spring surrounding said pressure bolt and disposed between said first and second locking elements, said spring urges said pressure bolt towards said friction elements.

5. An improvement as defined in claim 1, wherein said stationary component is a magnetic core associated with a solenoid, said armature is attracted to said magnetic core by a magnetic field opposing and overcoming the force of said resilient means when said solenoid is energized.